(12) United States Patent
Peacock et al.

(10) Patent No.: US 9,199,883 B2
(45) Date of Patent: Dec. 1, 2015

(54) FERTILIZER COMPOSITION CONTAINING MICRONUTRIENTS AND METHODS OF MAKING SAME

(75) Inventors: Lawrence Alan Peacock, Riverview, FL (US); Samuel Stacey, Adelaide (AU); Michael McLaughlin, Adelaide (AU)

(73) Assignee: The Mosaic Company, Plymouth, MN (US)

( * ) Notice: Subject to any disclaimer, the term of this patent is extended or adjusted under 35 U.S.C. 154(b) by 308 days.

(21) Appl. No.: 13/034,781

(22) Filed: Feb. 25, 2011

(65) Prior Publication Data

US 2011/0214465 A1    Sep. 8, 2011

Related U.S. Application Data

(60) Provisional application No. 61/309,894, filed on Mar. 3, 2010, provisional application No. 61/311,011, filed on Mar. 5, 2010.

(51) Int. Cl.

| | |
|---|---|
| *C05B 1/04* | (2006.01) |
| *C05B 7/00* | (2006.01) |
| *C05C 9/00* | (2006.01) |
| *C05D 9/00* | (2006.01) |
| *C05D 9/02* | (2006.01) |
| *C05G 3/00* | (2006.01) |

(52) U.S. Cl.
CPC .............. *C05B 1/04* (2013.01); *C05G 3/0029* (2013.01)

(58) Field of Classification Search
CPC .............. C05B 1/04; C05B 7/00; C05C 9/00; C05D 9/00; C05D 9/02; C05G 3/0029; C05G 3/0041

USPC .................................................. 71/31–64.13
See application file for complete search history.

(56) References Cited

U.S. PATENT DOCUMENTS

| | | | |
|---|---|---|---|
| 3,342,577 | A | 9/1967 | Blouin et al. |
| 3,392,007 | A | 7/1968 | Christoffel et al. |
| 3,419,379 | A | 12/1968 | Goodale et al. |
| 3,425,819 | A | 2/1969 | Barry et al. |
| 3,477,842 | A | 11/1969 | Cook et al. |

(Continued)

FOREIGN PATENT DOCUMENTS

| | | |
|---|---|---|
| CN | 1060648 | 4/1992 |
| CN | 1137031 | 12/1996 |

(Continued)

OTHER PUBLICATIONS

International Preliminary Report dated Sep. 4, 2012 for PCT Application No. PCT/US2011/025880 filed Feb. 23, 2011, 7 pages.

(Continued)

*Primary Examiner* — Jennifer A Smith
(74) *Attorney, Agent, or Firm* — Patterson Thuente Pedersen, P.A.

(57) ABSTRACT

A fertilizer composition including a base fertilizer granule with a barrier coating and one or more micronutrients. The base fertilizer material is coated with a barrier coating, and then a coating of one or more micronutrients. Alternatively, the base fertilizer material is coated with a barrier coating having discrete particles of micronutrients dispersed throughout. The barrier coating acts to physically and chemically isolate the micronutrient particles from the underlying fertilizer composition such that more of the micronutrient is available to the soil solution, and ultimately to the root zone of the plant.

5 Claims, 3 Drawing Sheets

(56) References Cited

U.S. PATENT DOCUMENTS

| | | | |
|---|---|---|---|
| 3,560,192 | A | 2/1971 | Cicco |
| 3,580,715 | A | 5/1971 | Dilday |
| 3,697,245 | A | 10/1972 | Dilday |
| 3,871,906 | A | 3/1975 | Sweeny et al. |
| 3,981,713 | A | 9/1976 | Tucker et al. |
| 4,015,970 | A | 4/1977 | Hennart |
| 4,023,955 | A | 5/1977 | Mueller |
| 4,042,366 | A | 8/1977 | Fersch et al. |
| 4,469,502 | A | 9/1984 | Heller et al. |
| 4,494,976 | A | 1/1985 | Backlund |
| 4,563,208 | A | 1/1986 | Backlund |
| 4,565,564 | A | 1/1986 | Backlund |
| 4,880,455 | A | 11/1989 | Blank |
| 4,936,897 | A | 6/1990 | Pipko et al. |
| 5,030,267 | A | 7/1991 | Vlnaty et al. |
| 5,152,821 | A | 10/1992 | Walter |
| 5,653,782 | A | 8/1997 | Stern et al. |
| 5,849,060 | A | 12/1998 | Diping et al. |
| 5,938,813 | A | 8/1999 | Araya et al. |
| 5,997,601 | A | 12/1999 | Kust |
| 6,110,866 | A | 8/2000 | Walker |
| 6,187,074 | B1 | 2/2001 | Von Locquenghien et al. |
| 6,251,280 | B1 | 6/2001 | Dai et al. |
| 6,287,359 | B1 | 9/2001 | Erhardt et al. |
| 6,338,746 | B1 | 1/2002 | Detrick et al. |
| 6,544,313 | B2 | 4/2003 | Peacock et al. |
| 7,267,707 | B2 | 9/2007 | Rosenthal et al. |
| 7,497,891 | B2 | 3/2009 | Peacock |
| 2003/0040435 | A1 | 2/2003 | Haberle et al. |
| 2005/0039509 | A1 | 2/2005 | Muma |
| 2005/0064001 | A1 | 3/2005 | Wiesman et al. |
| 2008/0196463 | A1 | 8/2008 | Hudson et al. |
| 2009/0113966 | A1 | 5/2009 | Kweeder |
| 2010/0029477 | A1 | 2/2010 | McLaughlin et al. |

FOREIGN PATENT DOCUMENTS

| | | |
|---|---|---|
| CN | 1569774 | 1/2005 |
| CN | 101362664 | 2/2009 |
| JP | H 01164788 | 6/1989 |
| JP | H 02196079 | 8/1990 |
| JP | H 05279158 | 10/1993 |
| JP | H 07206565 | 8/1995 |
| JP | H 10231191 | 9/1998 |
| UA | 43789 U | 8/2009 |
| WO | WO 2004/000749 A1 | 12/2003 |
| WO | WO 2006/133893 A2 | 12/2006 |
| WO | WO 2010/043819 A1 | 4/2010 |

OTHER PUBLICATIONS

International Search Report dated Nov. 11, 2011 for PCT Application No. PCT/US2011/025880 filed Feb. 23, 2011, 11 pages.
Office Action dated Dec. 26, 2012 for VN Application No. 1-2012-02672 filed Feb. 23, 2011, 2 pages.
Office Action dated Apr. 8, 2013 for AU Application No. 2011221469 filed Feb. 23, 2011, 3 pages.
Office Action dated May 10, 2013 for New Zealand Application No. 602338 filed Feb. 23, 2011, 2 pages.
Chinese Office Action dated Sep. 29, 2013 for Chinese Application No. 201180012683.7 filed Feb. 23, 2011, 11 pages.
Colombian Office Action dated Jul. 31, 2013 for Colombian Application No. 12-150.194 filed Feb. 23, 2011, 6 pages.
Office Action known to applicant at least as of Dec. 31, 2013 for Saudi Arabia Application No. 111320244 filed Mar. 2, 2011, 6 pages.
Office Action dated Nov. 25, 2013 for Russian Application No. 2012142001 filed Feb. 23, 2011, 10 pages.
Office Action dated Feb. 28, 2014 for Malaysian Application No. PI 2012003930 filed Feb. 23, 2011, 3 pages.
Office Action dated Mar. 18, 2014 for Ukraine Application No. 201211402 filed Oct. 2, 2012, 6 pages.
Office Action dated Oct. 14, 2014 for Chilean Application No. 2427-2012, 9 pages.
Office Action dated Aug. 5, 2014 for Chinese Application No. 201180012683.7, 12 pages.
Office Action dated Jan. 20, 2015 for Chinese Application No. 201180012683.7, 27 pages.
Office Action known to Applicant at least as of Nov. 4, 2014 for Egyptian Application No. 1485/2012, 4 pages.
Office Action known to Applicant at least as of Feb. 6, 2015 for Indonesian Application No. WO201203606, 3 pages.
Office Action dated Nov. 10, 2014 for Japanese Application No. 2012-556105, 10 pages.
Office Action dated Jul. 15, 2014 for Malaysian Application No. PI2012003930, 3 pages.
Office Action known to Applicant at least as of Sep. 18, 2014 for Saudi Arabian Application No. 111320244, 5 pages.
Notice of Allowance dated Mar. 2, 2015 for Ukrainian Application No. 2012-11402, 3 pages.
Office Action dated Sep. 29, 2014 for Ukrainian Application No. 2012-11402, 3 pages.
Office Action dated May 12, 2015 for Mexican Application No. MX/a/2012/010144, 2 pages.
Colombian Office Action from Colombian Application No. 12-150.194, dated Sep. 10, 2015, 9 pages.
Chilean Office Action from Chilean Application No. 2427-2012, known to Applicant as of Aug. 13, 2015, 10 pages.

FERTILIZER COMPOSITION CONTAINING MICRONUTRIENTS AND METHODS OF MAKING SAME

RELATED APPLICATIONS

The present application claims the benefit of U.S. Provisional Application No. 61/309,894 filed Mar. 3, 2010, and U.S. Provisional Application No. 61/311,011 filed Mar. 5, 2010, each of which is hereby incorporated herein in their entirety by reference.

FIELD OF THE INVENTION

The invention relates generally to fertilizer composition, and more particularly to fertilizer compositions containing micronutrients for subsequent introduction into soil solution and eventually into the root zone of a plant.

BACKGROUND OF THE INVENTION

In addition to primary nutrients, such as carbon, hydrogen, oxygen, nitrogen, phosphorous, and potash, micronutrients and secondary nutrients are elements which are also essential for plant growth, but are required in much smaller amounts than those of the primary nutrients. Secondary nutrients can include, for example, calcium (Ca), sulfur (S), and magnesium (Mg). Micronutrients can include, for example, boron (B), copper (Cu), iron (Fe), manganese (Mn), molybdenum (Mo), zinc (Zn), chlorine (Cl), cobalt (Co), sodium (Na), and combinations thereof.

Micronutrient sources vary considerably in their physical state, chemical reactivity, cost, and availability to plants. Four main classes of micronutrient sources include: (1) inorganic products such as oxides, carbonates, and metallic salts such as sulfates, chlorides, and nitrates; (2) synthetic chelates formed by combining a chelating agent with a metal through coordinate bonding; (3) natural organic complexes including ligno-sulfonates, polyflavonoids, and phenols, made by reacting metallic salts with certain organic by-products of the wood pulp industry or related industries; and (4) frits, or fritted glassy products, containing a concentration of micronutrient from about 2 to 25 percent.

The most common method of micronutrient application for crops is soil application. Recommended application rates usually are less than 10 lb/acre on an elemental basis so uniform application of micronutrient sources separately in the field can be difficult. Including micronutrients with mixed fertilizers is a convenient method of application and allows more uniform distribution with conventional application equipment. Costs also are reduced by eliminating a separate application step. Four methods of applying micronutrients with mixed fertilizers can include incorporation during manufacture, bulk blending with granular fertilizers, coating onto granular fertilizers, and mixing with fluid fertilizers.

Incorporation during manufacture is the incorporation of one or more micronutrients directly in fertilizers granules, such as NPK or phosphate fertilizer, as they are being produced. This practice allows each granule of phosphate fertilizer to have a consistent concentration of the desired micronutrient(s) and uniform distribution of the micronutrient(s) throughout the granular fertilizers. Because the phosphate granules are evenly dispersed over the growing area, the contained micronutrient(s) are as well. However, because the micronutrient source is in contact with the mixed fertilizer components under conditions of high temperature and moisture during manufacture, the rate of chemical reactions with the phosphates is increased which can reduce the plant availability of some micronutrients because the micronutrient(s) remain in the phosphate granule.

Bulk blending with granular fertilizers is the practice of bulk blending separately granulated micronutrient compounds with granular phosphate fertilizers and granular potash fertilizers. The main advantage to this practice is that fertilizer grades can be produced which will provide the recommended micronutrient rates for a given field at the usual fertilizer application rates. The main disadvantage is that segregation of nutrients can occur during the blending operation and with subsequent handling. In order to reduce or prevent size segregation during handling and transport, the micronutrient granules must be close to the same size as the phosphate and potash granules. Because the micronutrients are required in very small amounts for plant nutrition, this practice has resulted in granules of micronutrients unevenly distributed and generally too far from most of the plants to be of immediate benefit as most migrate in soil solution only a few millimeters during an entire growing season.

Coating of granular fertilizers decreases the possibility of segregation. However, some binding materials are unsatisfactory because they do not maintain the micronutrient coatings during bagging, storage, and handling, which results in segregation of the micronutrient sources from the granular fertilizer components. Steps have been taken to reduce the segregation problem in the case secondary nutrients and micronutrients, for example as in the case of sulfur or sulfur platelets in the fertilizer portion as described in U.S. Pat. No. 6,544,313 entitled "Sulfur-Containing Fertilizer Composition and Method for Preparing Same" and in the case of micronutrients as described in U.S. Pat. No. 7,497,891 entitled, "Method for Producing a Fertilizer with Micronutrients," both of which are incorporated herein by reference in their entireties.

Similar to incorporation of micronutrients during manufacture described above, the micronutrient source is in contact with the fertilizer components in a coated product and the micronutrients can undergo chemical reactions with the phosphates, thereby reducing the plant availability of some micronutrients because the micronutrient(s) remain in the phosphate granule.

There remains a need for a fertilizer product that contains one or more micronutrients that maximizes the introduction of the micronutrient(s) into soil solution and ultimately to the root zone of plants.

SUMMARY OF THE INVENTION

Embodiments of the invention are directed to the incorporation of desired micronutrient(s) into granular fertilizer formulations for subsequent introduction of the micronutrients into soil solution and eventually into the root zone of the plant. A coating over the base fertilizer is used as a barrier coating or separator to prevent or reduce chemical/physical interactions between the micronutrient(s) and the base fertilizer.

In one embodiment of the invention, a barrier coating material is in a liquid or molten state. One or more micronutrients are then incorporated into the melt of the barrier coating material. The barrier coating material is spray coated on an appropriate fertilizer granule, such as an ammonium phosphate, calcium phosphate, or potassium phosphate fertilizer. The micronutrient particles are retained within the barrier coating material, separated from chemical and physical interaction with the underlying fertilizer material.

In another embodiment of the invention, an appropriate fertilizer granule, such as an ammonium phosphate, calcium phosphate, or potassium phosphate is coated by conventional methods such as spray coating with a barrier coating material. One or more micronutrients are then added in either a continuous or discontinuous coating around the barrier coated fertilizer granules such that the micronutrient particles are chemically and physically separated or isolated from the underlying fertilizer material.

The above summary of the invention is not intended to describe each illustrated embodiment or every implementation of the present invention. The detailed description that follows more particularly exemplifies these embodiments.

DETAILED DESCRIPTION OF THE DRAWINGS

Figure 1:
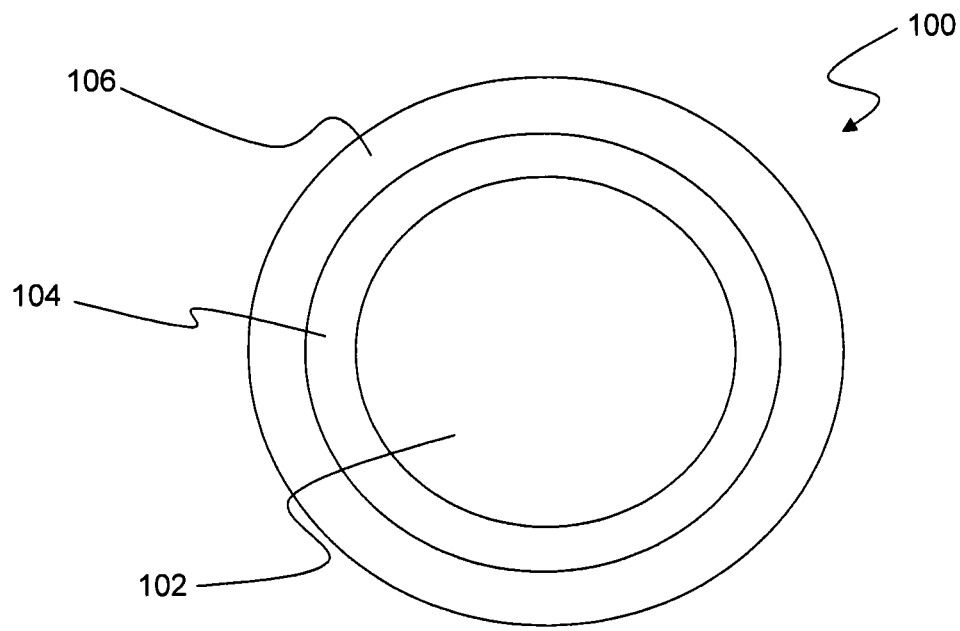
FIG. 1 is a fertilizer granule containing micronutrients according to one embodiment of the invention.

According to one embodiment of the invention illustrated in FIG. 1, a fertilizer granule containing micronutrients 100 can comprise a core fertilizer portion 102, a barrier coating material 104 coated or otherwise applied over at least a portion of fertilizer portion 102, and a micronutrient coating 106 containing one or more micronutrients covering at least a portion of barrier coating material 104.

In this embodiment, barrier coating material 104 can be a liquid, solid or molten form, and can be sprayed, curtain coated, or any of a number of suitable coating techniques to form a continuous or discontinuous coating over fertilizer portion 102. In one particular embodiment, a barrier coating material is combined with water to form a slurry that is sprayed onto fertilizer granules in a granulator. The granules are then dried. The barrier coated granules are then subsequently coated with an appropriate micronutrient, such as a complex of micronutrient, for example, $ZnSO_4.H_2O$, by any of a number of suitable coating techniques, such as spray coating.

Optionally, a hot coating of polymer can be added to the barrier coated granules before addition of the micronutrient to provide a tacky surface for adherence of the micronutrients to the granules, and further to improve the water solubility of micronutrients. Such polymers can comprise, for example, polyethyleneimine (PEI).

Figure 2:
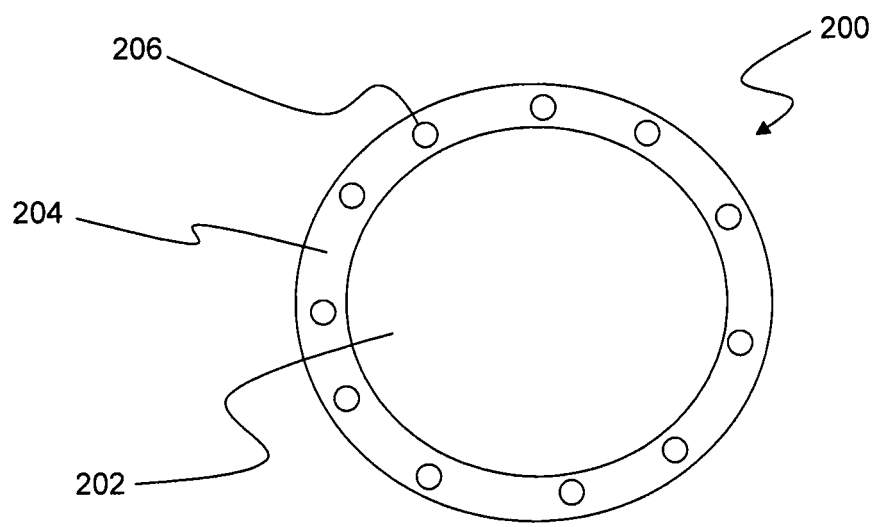
FIG. 2 is a fertilizer granule containing micronutrients according to another embodiment of the invention.

According to an alternative embodiment of the invention illustrated in FIG. 2, a fertilizer granule containing micronutrients 200 can comprise a core fertilizer portion 202, a barrier coating material 204 coated or otherwise applied over at least a portion of fertilizer portion 202, and one or more micronutrients 206 dispersed within barrier coating material 204.

Fertilizer portion 102, 202 can comprise any suitable fertilizer, such as, for example, nitrates, ureas, potashes, phosphate fertilizers such as mono-ammonium phosphate (MAP), diammonium phosphate (DAP), single superphosphate, triple superphosphate, potassium phosphates, calcium phosphates and combinations thereof.

Barrier coating material 104, 204 can comprise one or more materials that isolate the micronutrient(s) from the fertilizer composition to reduce or eliminate chemical reactions and/or other interactions between the micronutrient(s) and the underlying fertilizer composition. For example, if the underlying fertilizer composition is a phosphate, barrier coating material 104 can comprise urea, langbeinite (otherwise known as K-Mag or $K_2Mg_2(SO_4)_3$), ammonium sulfate (($NH_4)_2SO_4$), potassium sulfate ($K_2SO_4$), magnesium sulfate ($MgSO_4$), calcium sulfate ($CaSO_4$), elemental sulfur (S), silicates, their respective hydrate (salt with associated water of hydration [$.xH_2O$]), and combinations thereof.

Micronutrients 106, 206 can comprise boron (B), copper (Cu), iron (Fe), manganese (Mn), molybdenum (Mo), zinc (Zn), chlorine (Cl), cobalt (Co), sodium (Na), nickel (Ni), selenium (Se), and combinations thereof. Micronutrients 106, 206 can be in the form of discrete particles or platelets, and can optionally be incorporated into a PEI matrix.

The following examples discuss particular embodiments of the invention. The equipment used in preparation of each of the examples was a four-foot diameter pan granulator (13 inches wide with a 5 inch bed depth), equipped with a variable-frequency drive (VFD) and mounted vertically. The drum was not flighted; it was equipped only with slip rods to keep the bed moving.

Example materials were prepared in batch mode by first charging the granulated with uncoated MAP, followed by the addition of the appropriate barrier material to evenly coat the MAP particles. The appropriate micronutrient(s) were then added to these coated granules, together with a polymer that is effective at improving the water solubility of micronutrients.

Example 1

Urea Barrier Coating

Uncoated MAP was completely coated with molten urea (approximately 10%) and allowed to cool. The coated granules were spray-coated with hot PEI and subsequently coated with zinc in the form of $ZnSO_4.H_2O$ or copper in the form of $Cu\ SO_4.5H_2O$. The complex was then formed by spraying with a small amount (approximately 0.25%) of acidic water (pH adjusted to approximately 2). Talc (approximately 1%) was added to yield free-flowing granules.

Example 2

K-Mag ($K_2Mg_2(SO_4)_3$) Coating

Uncoated MAP was completely coated with powdered K-Mag blended with half its weight of diluted calcium lignosulfonate solution (diluted to 70/30 w/w $CLS/H_2O$ with CLS comprising 58% solids). The slurry was evenly spread over the tumbling bed of MAP granules and heated to dryness. The coated granules were spray-coated with hot PEI (99%) and subsequently coated with zinc in the form of $ZnSO_4.H_2O$. The complex was then formed by spraying with a small amount (approximately 0.25%) of acidic water (pH adjusted to approximately 2 with citric acid). The coated granules were then air-dried. Talc (approximately 1%) was added to yield free-flowing granules.

Example 3

Ammonium Sulfate (($NH_4)_2SO_4$) Coating

Uncoated MAP was completely coated with powdered ammonium sulfate blend with an equal weight of diluted calcium lignosulfonate solution (diluted to 70/30 w/w CLS/

$H_2O$ with CLS comprising 58% solids) to form a flowable slurry. The slurry was evenly spread over the tumbling bed of MAP granules and heated to dryness. The coated granules were spray-coated with hot PEI (99%) and subsequently coated with zinc in the form of $ZnSO_4.H_2O$. The complex was then formed by spraying with a small amount (approximately 0.25%) of acidic water (pH adjusted to approximately 2 with citric acid). The coated granules were then air-dried. Talc (approximately 1%) was added to yield free-flowing granules.

Example 4

Potassium Sulfate ($K_2SO_4$) Coating

Uncoated MAP was completely coated with powdered ammonium sulfate blend with half its weight of diluted calcium lignosulfonate solution (diluted to 70/30 w/w $CLS/H_2O$ with CLS comprising 58% solids) to form a flowable slurry. The slurry was evenly spread over the tumbling bed of MAP granules and heated to dryness. The coated granules were spray-coated with hot PEI (99%) and subsequently coated with zinc in the form of $ZnSO_4.H_2O$. The complex was then formed by spraying with a small amount (approximately 0.25%) of acidic water (pH adjusted to approximately 2 with citric acid). The coated granules were then air-dried. Talc (approximately 1%) was added to yield free-flowing granules.

Figure 3:
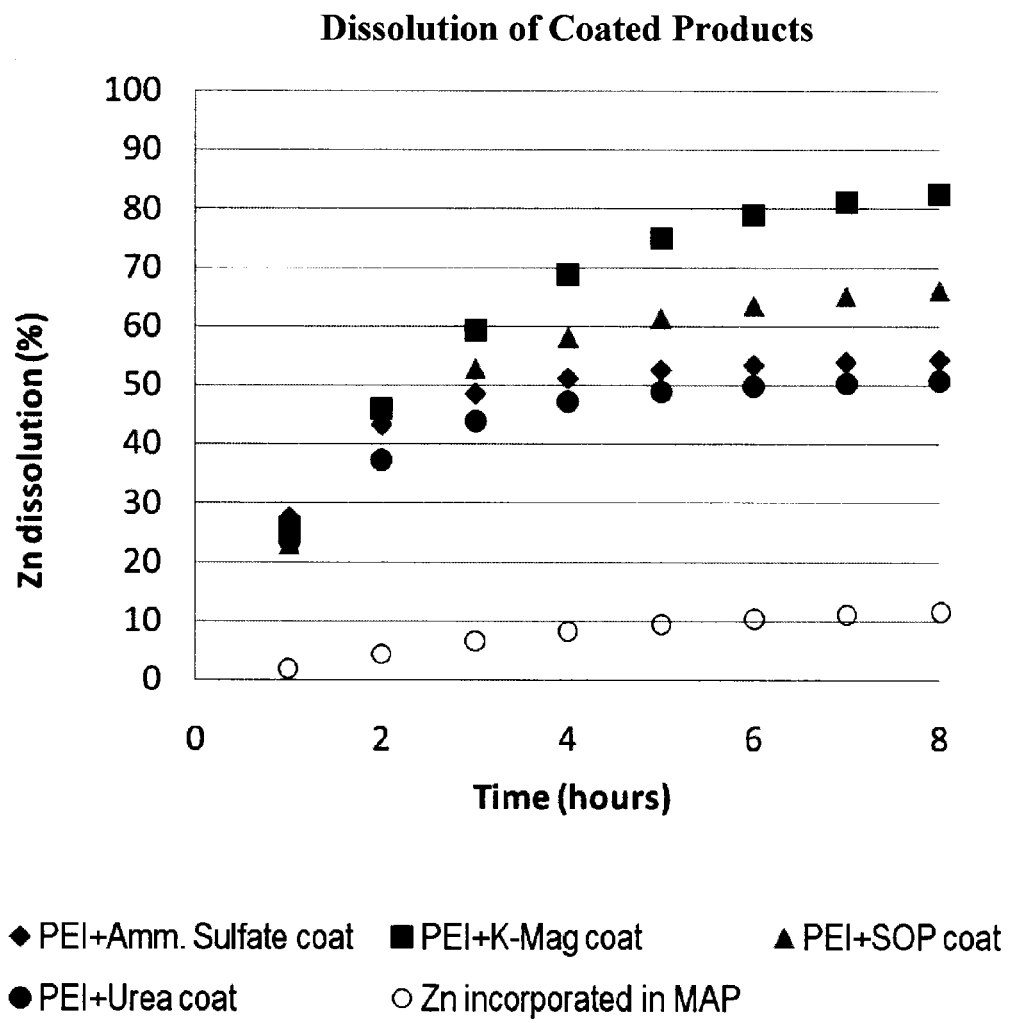
FIG. 3 is a graph comparing micronutrient dissolution over time for various barrier coating materials.

As shown in the graph in FIG. 3, the coated fertilizer composition using K-Mag as the barrier coat material (Example 2) resulted in the highest % dissolution of the micronutrient after eight hours. All the proposed examples resulted in significantly higher % dissolution than a product wherein the micronutrient is incorporated in the phosphate fertilizer.

Figure 4:
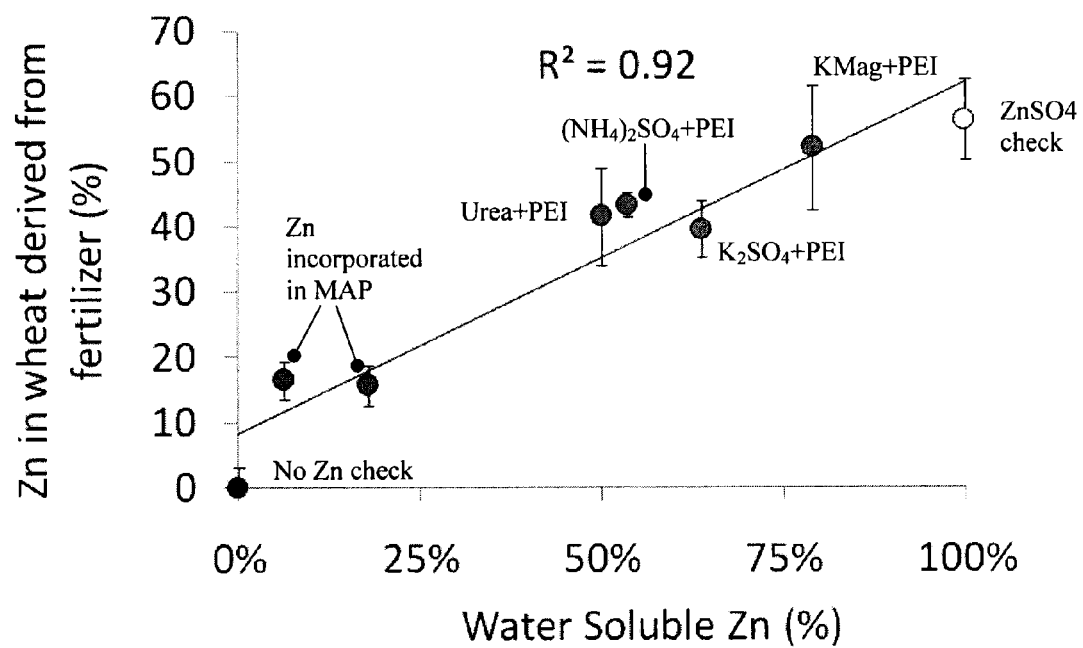
FIG. 4 is a graph depicting the effect of water solubility on plant uptake of zinc.

As shown in the graph in FIG. 4, the coated fertilizer composition using K-Mag as the barrier coat material (Example 2) also performed the best in terms of effect of water solubility on plant uptake of Zinc.

The invention may be embodied in other specific forms without departing from the essential attributes thereof; therefore, the illustrated embodiments should be considered in all respects as illustrative and not restrictive.

What is claimed is:

1. A fertilizer composition comprising:
   a base fertilizer granule, the base fertilizer granule comprising at least one primary nutrient;
   a barrier coating covering at least a portion of an outer surface of the base fertilizer granule, the barrier coating being selected from the group consisting of urea, langbeinite, ammonium sulfate, potassium sulfate, magnesium sulfate, calcium sulfate, elemental sulfur, silicates, respective hydrates, and combinations thereof;
   one or more micronutrients dispersed within the barrier coating such that the one or more micronutrients are chemically and physically isolated from the base fertilizer granule; and
   a polymer coating covering at least a portion of the barrier coating, and one or more additional micronutrients incorporated into or onto the polymer coating.

2. The fertilizer composition according to claim 1, wherein the base fertilizer is selected from the group consisting of monoammonium phosphate, diammonium phosphate, single superphosphate, triple superphosphate, and combinations thereof.

3. The fertilizer composition according to claim 1, wherein the barrier coating is selected such that the barrier coating is non-reactive with the base fertilizer and the one or more micronutrients.

4. The fertilizer composition according to claim 1, wherein the one or more micronutrients is selected from the group consisting of boron, copper, iron, manganese, molybdenum, zinc, chlorine, cobalt, sodium, nickel, selenium, and combinations thereof.

5. The fertilizer composition according to claim 1, wherein the polymer coating comprises a polymer from a polyethyleneimine (PEI) family of polymers.

* * * * *